United States Patent
Sone et al.

(10) Patent No.: US 12,371,285 B2
(45) Date of Patent: Jul. 29, 2025

(54) IMAGE FORMING APPARATUS FORMING IMAGE ON SHEET ACCORDING TO SHEET TYPE

(71) Applicant: KYOCERA Document Solutions Inc., Osaka (JP)

(72) Inventors: Daiki Sone, Osaka (JP); Hiroki Takehana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 251 days.

(21) Appl. No.: 18/214,540

(22) Filed: Jun. 27, 2023

(65) Prior Publication Data

US 2024/0010451 A1    Jan. 11, 2024

(30) Foreign Application Priority Data

Jul. 6, 2022    (JP) .................................. 2022-108989

(51) Int. Cl.
*B65H 1/04*    (2006.01)

(52) U.S. Cl.
CPC .......... *B65H 1/04* (2013.01); *B65H 2405/111* (2013.01); *B65H 2557/64* (2013.01); *B65H 2801/15* (2013.01)

(58) Field of Classification Search
USPC ...... 358/1.13, 1.1, 1.15; 709/247; 346/107.3
See application file for complete search history.

(56) References Cited

U.S. PATENT DOCUMENTS

| | | | |
|---|---|---|---|
| 8,107,095 B2* | 1/2012 | Kawafuji | H04N 1/00222 358/1.18 |
| 9,191,531 B2* | 11/2015 | Shigenobu | H04N 1/00435 |
| 9,542,142 B2* | 1/2017 | Nakatsu | G06F 3/1273 |
| 9,639,789 B2* | 5/2017 | Tokushima | G06T 11/60 |
| 10,402,133 B2* | 9/2019 | Ikeda | G06F 3/1285 |
| 10,974,920 B2* | 4/2021 | Miyahara | B65H 31/10 |
| 2007/0263242 A1 | 11/2007 | Takahashi | |
| 2008/0212122 A1* | 9/2008 | Kawafuji | H04N 1/32128 358/1.9 |
| 2016/0124692 A1* | 5/2016 | Nakatsu | G06F 3/1273 358/1.15 |
| 2016/0259999 A1* | 9/2016 | Tokushima | G06F 3/12 |

(Continued)

FOREIGN PATENT DOCUMENTS

JP    2007301911 A    * 11/2007    .......... G03G 15/502

*Primary Examiner* — Marcus T Riley
(74) *Attorney, Agent, or Firm* — IP Business Solutions, LLC.

(57) ABSTRACT

An image forming apparatus for a first purpose forms an image on a sheet, according to a sheet type. The image forming apparatus for the first purpose includes a conversion device and an image forming device. The conversion device converts second information for defining the sheet type in association with another image forming apparatus for a second purpose different from the first purpose, into third information of a same format as the first information for defining the sheet type in association with the image forming apparatus for the first purpose. The image forming device forms an image on the sheet P according to the third information, when the sheet P, the sheet type of which has been defined by the second information, is designated. The first information and the third information each define the sheet type more detailedly than the second information.

5 Claims, 12 Drawing Sheets

(56) References Cited

U.S. PATENT DOCUMENTS

2018/0165048 A1* 6/2018 Ikeda ................. H04N 1/00244
2018/0334349 A1* 11/2018 Miyahara ............... B65H 31/10
2024/0010451 A1* 1/2024 Sone .................... G06F 3/1285

* cited by examiner

Fig.2

| Q1 | Q2 | Q3 | Q4 |
|---|---|---|---|
| MATERIAL AND SHAPE OF PAPER SHEET | FINISH OF FRONT AND BACK FACES | PREPROCESSING | OTHER CHARACTERISTICS |
| • Plain<br>• Labels<br>• Envelope<br>• Tab stock | • Not specified<br>• Inkjet treated<br>• Inkjet Matte<br>• High Gloss<br>• Gloss<br>• Silk<br>• Satin<br>• Matte | • Pre printed<br>• Pre punched | • Weight<br>• Media color |

| SECOND INFORMATION | | THIRD INFORMATION | |
|---|---|---|---|
| (SECOND PURPOSE: PAPER TYPE FOR OFFICE MODEL) | | (FIRST PURPOSE: PAPER TYPE FOR PRODUCTION MODEL) | |
| PLAIN PAPER (IN2) Q10(Q11) | Q1 → | MATERIAL AND SHAPE OF PAPER SHEET | Plain |
| | Q2 → | FINISH OF FRONT AND BACK FACES | Not specified |
| | Q3 → | PREPROCESSING | Not specified |
| | Q4 → | WEIGHT (OTHER CHARACTERISTICS) | 100gsm |
| PREPRINTED PAPER (IN2) Q10(Q12) | Q1 → | MATERIAL AND SHAPE OF PAPER SHEET | Plain |
| | Q2 → | FINISH OF FRONT AND BACK FACES | Not specified |
| | Q3 → | PREPROCESSING | Pre printed |
| | Q4 → | WEIGHT (OTHER CHARACTERISTICS) | 100gsm |
| ... | | ... | ... |

311

IN3 spans Q1–Q4 third-information columns.

Fig.7A

| PAPER SETTING FOR PAPER TRAY 15A | | |
|---|---|---|
| SECOND INFORMATION (SECOND PURPOSE: OFFICE MODEL) | | Not Specified |
| FIRST INFORMATION (FIRST PURPOSE: PRODUCTION MODEL) | MATERIAL AND SHAPE OF PAPER SHEET | Plain |
| | FINISH OF FRONT AND BACK FACES | Inkjet treated |
| | PREPROCESSING | Pre printed |
| | WEIGHT (OTHER CHARACTERISTICS) | 100gsm |

| 312B PAPER SETTING FOR PAPER TRAY 15B | | | | | |
|---|---|---|---|---|---|
| SECOND INFORMATION (SECOND PURPOSE: OFFICE MODEL) | Not Specified ← IN2, Q1 | | | | |
| FIRST INFORMATION (FIRST PURPOSE: PRODUCTION MODEL) | MATERIAL AND SHAPE OF PAPER SHEET | FINISH OF FRONT AND BACK FACES | PREPROCESSING | WEIGHT (OTHER CHARACTERISTICS) | IN1 |
| | Plain | Inkjet treated — Q2 | Pre printed — Q3 | 200gsm — Q4 | |

Fig.7C

| PAPER SETTING FOR PAPER TRAY 15C | | |
|---|---|---|
| SECOND INFORMATION (SECOND PURPOSE: OFFICE MODEL) | PREPRINTED PAPER | |
| THIRD INFORMATION (FIRST PURPOSE: PRODUCTION MODEL) | MATERIAL AND SHAPE OF PAPER SHEET | Plain |
| | FINISH OF FRONT AND BACK FACES | Not Specified |
| | PREPROCESSING | Pre printed |
| | WEIGHT (OTHER CHARACTERISTICS) | 100gsm |

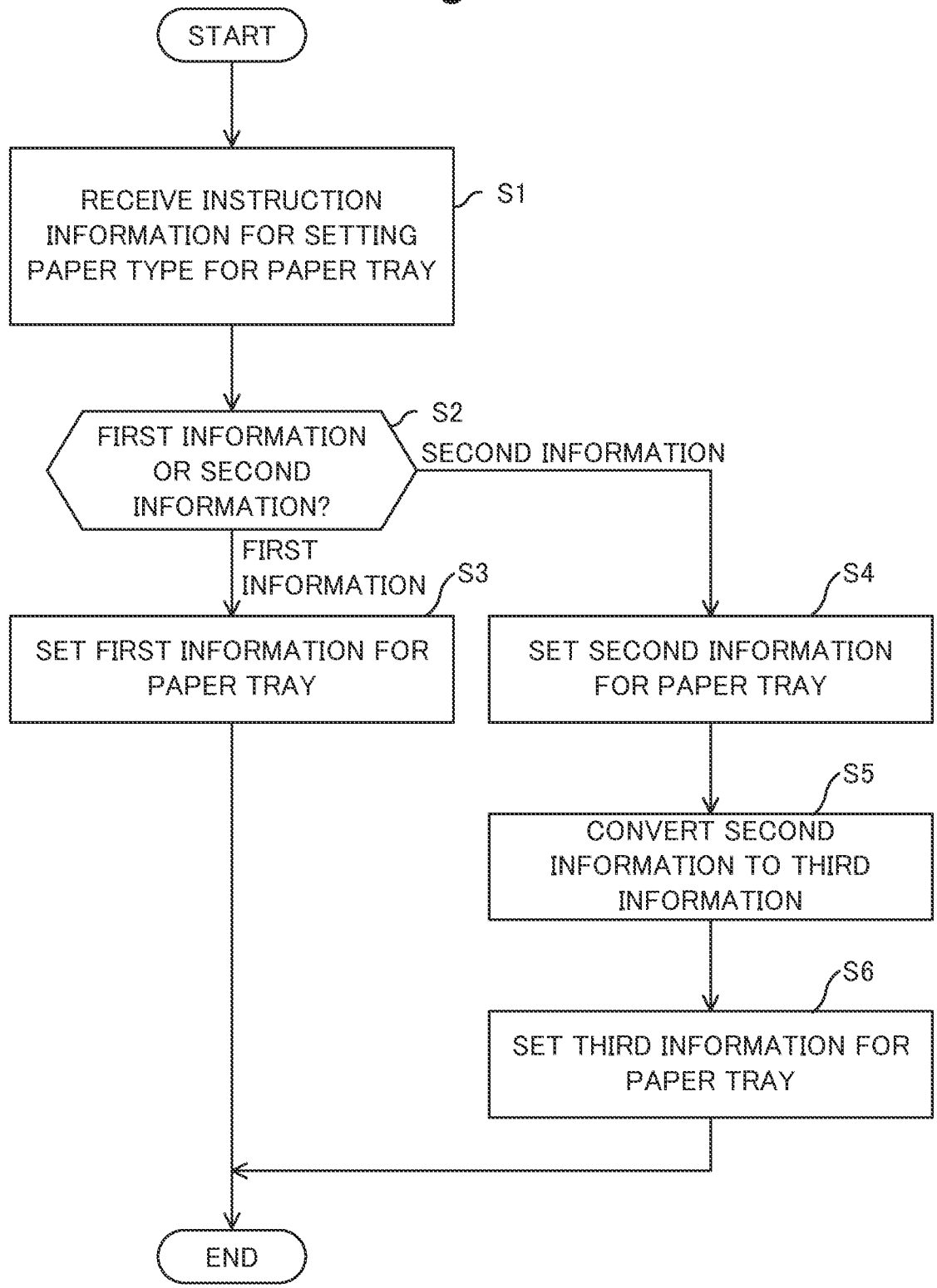

Fig.10

| SECOND INFORMATION (SECOND PURPOSE: PAPER TYPE FOR OFFICE MODEL) | THIRD INFORMATION (FIRST PURPOSE: PAPER TYPE FOR PRODUCTION MODEL) | |
|---|---|---|
| PLAIN PAPER Q1 Q2 Q3 Q4 Q5 | MATERIAL AND SHAPE OF PAPER SHEET | Plain |
| | FINISH OF FRONT AND BACK FACES | Not specified |
| | PREPROCESSING | Not specified |
| | WEIGHT (OTHER CHARACTERISTICS) | 100gsm |
| | DESTINATION | USA |
| | MATERIAL AND SHAPE OF PAPER SHEET | Plain |
| | FINISH OF FRONT AND BACK FACES | Not specified |
| | PREPROCESSING | Not specified |
| | WEIGHT (OTHER CHARACTERISTICS) | 101gsm |
| | DESTINATION | CHINA |
| | ⋮ | ⋮ |
| PREPRINTED PAPER Q1 Q2 Q3 Q4 Q5 | MATERIAL AND SHAPE OF PAPER SHEET | Plain |
| | FINISH OF FRONT AND BACK FACES | Not specified |
| | PREPROCESSING | Pre printed |
| | WEIGHT (OTHER CHARACTERISTICS) | 100gsm |
| | DESTINATION | USA |
| | MATERIAL AND SHAPE OF PAPER SHEET | Plain |
| | FINISH OF FRONT AND BACK FACES | Not specified |
| | PREPROCESSING | Pre printed |
| | WEIGHT (OTHER CHARACTERISTICS) | 101gsm |
| | DESTINATION | CHINA |
| | ⋮ | ⋮ |
| ⋮ | ⋮ | ⋮ |

IMAGE FORMING APPARATUS FORMING IMAGE ON SHEET ACCORDING TO SHEET TYPE

INCORPORATION BY REFERENCE

This application claims priority to Japanese Patent Application No. 2022-108989 filed on Jul. 6, 2022, the entire contents of which are incorporated by reference herein.

BACKGROUND

The present disclosure relates to an image forming apparatus.

In a printing system, property information of sheets is stored in advance, in a memory unit of a printing apparatus (image forming apparatus). Some printing apparatuses include a controller configured to cause a printing device to execute a printing operation using a sheet corresponding to the property information stored in the memory unit, under a condition according to the property information.

For example, the printing apparatus possesses a sheet information database of sheets of Type 1, a sheet information database of sheets of Type 2, and a sheet information database of sheets of Type 3.

"Type 1" represents a category for coping with a printing environment including an office environment, with high compatibility. The category of "Type 1" includes "plain paper", "thick paper 1", "recycled paper", "punched paper", "OHP", "tab paper", "OHP sheet", and so forth, which are broader than the category of "Type 3". "Type 1" is designed for enabling a designation method of the sheet type, which has been supported by the printing apparatuses for the office environment, to be followed in.

"Type 3" is designed for handling the sheets to be used in the printing system, with more detailed and more strict distinction of the sheets, than in "Type 1". "Type 3" may also be applied to a print-on-demand (POD) environment. "Type 3" represents sheet types defined by individual brands, such as "White recycled paper AA-500 manufactured by XXX Co., Ltd." or "Color printing paper manufactured by YYY Co., Ltd.".

"Type 2" represents a sheet type category based on the concept of "Favorite". There is an infinite number of sheet types classified as "Type 3". Allowing the user to utilize the infinite number of sheet types from the UI as they are may degrade the high operability. Therefore, "Type 2" has been prepared for enabling the sheet type to be designated, out of a fewer number of options only including the sheet types that are frequently used.

SUMMARY

The disclosure proposes further improvement of the foregoing techniques.

In an aspect, the disclosure provides an image forming apparatus for a first purpose, configured to form an image on a sheet according to a sheet type. The image forming apparatus includes a plurality of sheet trays, an image forming device, a control device, and a storage device. On each of the plurality of sheet trays, a plurality of sheets are placed. The image forming device forms an image on the sheet. The control device includes a processor, and acts as a setting device, a conversion device, and a controller, when the processor executes a control program. The setting device sets one of first information for defining the sheet type with a plurality of items in association with the image forming apparatus for the first purpose, and second information for defining the sheet type with a fewer number of items than the first information, in association with another image forming apparatus for a second purpose different from the first purpose, as paper definition information for defining the sheet type, with respect to each of the plurality of sheet trays. In the storage device, the paper definition information set by the setting device is stored, with respect to each of the sheet trays. The conversion device converts the second information stored in the storage device, to third information of a same format as the first information, when the second information is set with respect to the sheet tray. The controller causes, when the sheet, the sheet type of which has been defined by the second information, is designated as the sheet to be used for an image forming operation by the image forming device, the sheet tray to feed the designated sheet, and causes the image forming device to form an image on the sheet, through a control relevant to the sheet type indicated by the third information.

BRIEF DESCRIPTION OF THE DRAWINGS

FIG. 2 is a table showing an example of first information for defining a paper type associated with an image forming apparatus for a first purpose, according to the embodiment;

FIG. 6 is a schematic drawing showing an example of a first conversion table according to the embodiment;

FIG. 7A to FIG. 7C are schematic drawings each showing an example of paper definition information, specified for a paper tray according to the embodiment;

FIG. 8 is a flowchart showing an exemplary process of a paper type setting operation, for the paper tray of the image forming apparatus for the first purpose according to the embodiment;

FIG. 10 is a schematic drawing showing an example of a second conversion table, according to a variation of the embodiment.

DETAILED DESCRIPTION

Figure 1:
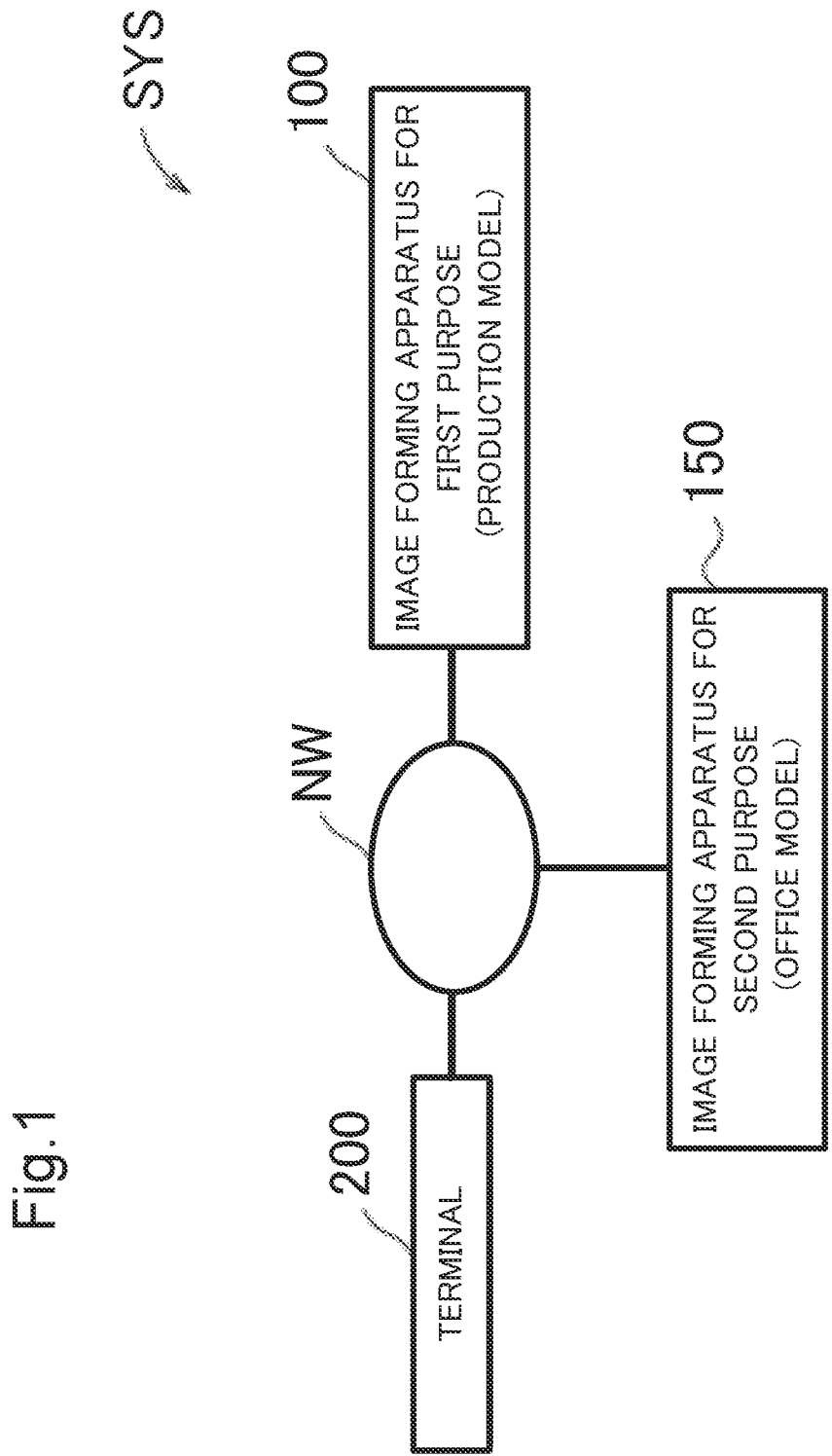
FIG. 1 is a schematic diagram showing an example of an image forming system according to an embodiment of the disclosure.

Hereafter, an image forming apparatus according to an embodiment of the disclosure, and a variation thereof, will be described with reference to FIG. 1 to FIG. 10. In the drawings, the same or corresponding elements are given the same numeral, and the description of such elements will not be repeated.

Referring to FIG. 1, an image forming system SYS according to the embodiment of the disclosure will be described hereunder. FIG. 1 is a schematic diagram showing an example of the image forming system SYS according to the embodiment. As shown in FIG. 1, the image forming system SYS includes an image forming apparatus 100 for a first purpose, a terminal 200, and a network NW. The image forming system SYS may also include an image forming apparatus 150 for a second purpose.

The image forming apparatus 100 for the first purpose forms an image on a paper sheet, according to the paper type. The paper sheet exemplifies the "sheet" in the disclosure. The paper type exemplifies the "sheet type" in the disclosure. The first purpose refers, for example, to the purpose of commercial printing. The commercial printing refers, for example, to a printing operation performed for the purpose of a commercial deal, to provide a work product, namely a "sheet having an image formed thereon", for or to a third party. In the operation for the first purpose, the "sheet having an image formed thereon", which is the work product is, for example, provided for a fee. The image forming apparatus 100 for the first purpose is, for example, an image forming apparatus for the purpose of commercial printing in a print-on-demand (POD) environment. The image forming apparatus 100 for the first purpose may be referred to, for example, as a "production model".

The image forming apparatus 150 for the second purpose forms an image on the paper sheet, according to the paper type. The second purpose is different from the first purpose. The second purpose includes, for example, the printing operation dedicated to offices. In the printing operation dedicated to offices, for example, the user him/herself is supposed to utilize the service, and the "sheet having an image formed thereon", which is the work product is provided to the user. In the operation for the second purpose, the provision of the "sheet having an image formed thereon", which is the work product is, for example, free of charge. The image forming apparatus 150 for the second purpose may be referred to, for example, as an "office model". Here, the second purpose may include the printing operation performed at home. In the printing operation at home, for example, the user him/herself is supposed to utilize the service at home, and the "sheet having an image formed thereon", which is the work product is provided to the user.

The terminal 200 is, for example, a personal computer, a tablet, or a smartphone.

The network NW includes, for example, the internet, a local area network (LAN), the public telephone network, and a short-range wireless communication network.

The terminal 200 and the image forming apparatus 100 for the first purpose are connected to the network NW, and communicate with each other via the network NW. The terminal 200 and the image forming apparatus 150 for the second purpose are connected to the network NW, and communicate with each other via the network NW.

Referring now to FIG. 2, first information IN1, for defining the paper type with a plurality of items in association with the image forming apparatus 100 for the first purpose (e.g., production model) shown in FIG. 1, will be described hereunder. The first information IN1 defines the paper type, with a format containing a predetermined number of items associated with the image forming apparatus 100 for the first purpose. The paper type refers to the characteristics of the paper sheet.

FIG. 2 specifies an exemplary content of the first information IN1. As shown in FIG. 2, the first information IN1 defines the paper type, on the basis of a combination of a plurality of characteristic items Q1 to Q4. The characteristic items Q1 to Q4 each specify the characteristics of the paper sheet. The characteristic items Q1 to Q4 are, for example, specified on the basis of paper sheet characteristics according to the standard job definition format (JDF) adopted by the commercial printing industry (production industry).

To be more specific, the characteristic items Q1 represent "material and shape of paper sheet", for defining the material or shape of the paper sheet. The characteristic items Q2 represent "finish of front and back faces", for defining the type of finish applied to the front and back faces of the paper sheet. The characteristic items Q3 represent "preprocessing", for defining the type of the preprocessing applied to the paper sheet. The characteristic items Q4 represent "other characteristics", for defining other characteristics of the paper sheet. The other characteristics of the paper sheet may include, for example, the weight and the color of the paper sheet.

For example, when the paper sheet is an ink jet printing paper, and a preprinted, thick paper (200 gsm), the first information IN1 defines the paper type, with the characteristic item Q1 indicating "Plain", the characteristic item Q2 indicating "Ink Jet Treated", the characteristic item Q3 indicating "Preprinted", and the characteristic item Q4 indicating "200 gsm". Here, "gsm" stands for "Grams per Square Meter (g/m 2)".

Figure 3:
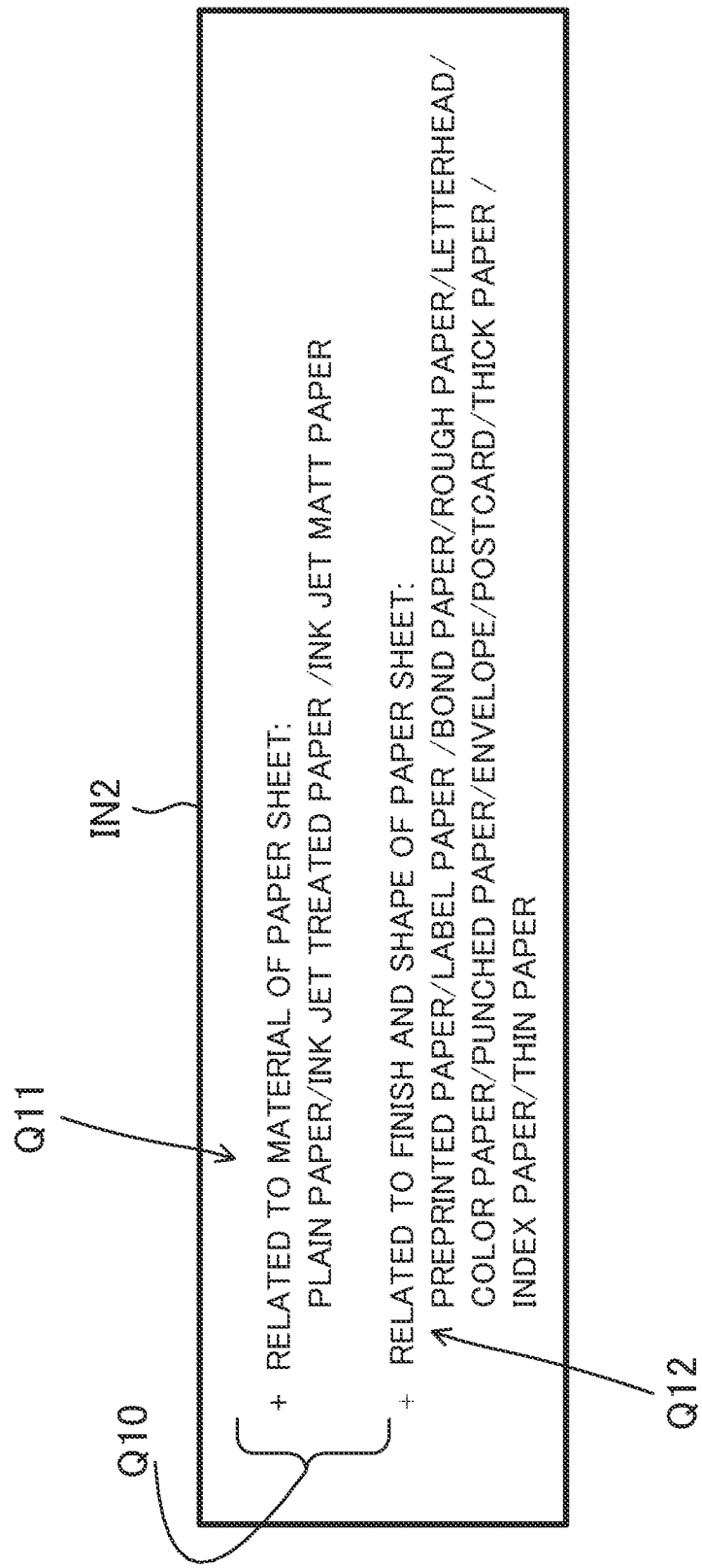
FIG. 3 is a schematic drawing showing an example of second information for defining a paper type associated with an image forming apparatus for a second purpose, according to the embodiment.

Referring to FIG. 3, second information IN2, for defining the paper type with a plurality of items in association with the image forming apparatus 150 for the second purpose (e.g., office model) shown in FIG. 1, will be described hereunder. The second information IN2 defines the paper type, with a format associated with the image forming apparatus 150 for the second purpose. The second information IN2 defines the paper type with a fewer number of items than the first information, in association with the image forming apparatus for the second purpose different from the first purpose. The paper type refers to the characteristics of the paper sheet.

FIG. 3 specifies an exemplary content of the second information IN2. As shown in FIG. 3, the second information IN2 defines the paper type, with at least one characteristic item Q10. The characteristic item Q10 represents the characteristics of the paper sheet. To be more specific, the characteristic item Q10 includes a characteristic item Q11 and a characteristic item Q12. In this embodiment, the second information IN2 defines the paper type, on the basis of one of the characteristic item Q11 and the characteristic item Q12.

To be more specific, the characteristic item Q10 represents "material of paper sheet, or processing/shape of paper sheet". characteristic item Q11 represents the "material of paper sheet", for defining the material of the paper sheet. For example, the material of the paper sheet is classified as plain paper, ink jet printing paper, or ink jet matt paper. The characteristic item Q12 represents the "processing/shape of paper sheet", for defining the processing or the shape of the paper sheet. For example, the processing or the shape of the paper sheet is classified as preprinted paper, label paper, bond paper, rough paper, letterhead, colored paper, punched paper, envelope, postcard, thick paper, index paper, or thin paper.

However, the paper type can only be defined with the characteristic item Q12, on the assumption that the material of the paper sheet is the plain paper. Accordingly, the paper type is unable to be defined in detail, with the second information IN2 alone. In contrast, the first information IN1 (FIG. 2) associated with the image forming apparatus 100 for the first purpose (FIG. 1) possesses a larger number of items than the second information IN2, and defines the paper type more detailed. The number of characteristic items Q1 to Q4 contained in the first information IN1 is larger than the number of characteristic items Q10 contained in the second information IN2. The format of the first information IN1 is different from that of the second information IN2.

Here, the image forming apparatus 100 for the first purpose (FIG. 1) is configured to utilize, as paper definition information stored in association with the sheet tray, the first information IN1 (FIG. 2), and the second information IN2 (FIG. 3), originally formatted for the image forming apparatus 150 for the second purpose, unlike the first information IN1 (FIG. 2).

In this embodiment, when the second information IN2 is set in association with the sheet tray, in the image forming apparatus 100 for the first purpose, a conversion device 301 (see FIG. 5) converts the second information IN2 into third information of the same format as the first information IN1 (hereinafter, "third information IN3"). The third information IN3 defines the paper type, on the basis of characteristic items Q1 to Q4, which are the same as the characteristic items Q1 to Q4 contained in the first information IN1. Thus, the third information IN3 defines the paper type, more detailed than the second information IN2.

The image forming apparatus 100 for the first purpose causes the image forming device to form an image, under an image formation control according to the paper type indicated by the third information IN3. Accordingly, the image forming apparatus 100 for the first purpose can execute an optimum image formation control (printing control), for the paper sheet the type of which is defined by the second information IN2. In other words, even when the paper sheet, the type of which has been defined in the format associated with the image forming apparatus 150 for the second purpose, is designated for the printing operation, the image forming apparatus 100 for the first purpose can execute the printing operation on such paper sheet, with the high-level printing performance, proper to the image forming apparatus 100 for the first purpose, thereby improving the picture quality of the image formed on the paper sheet. This point will be subsequently described in further detail.

Figure 4:
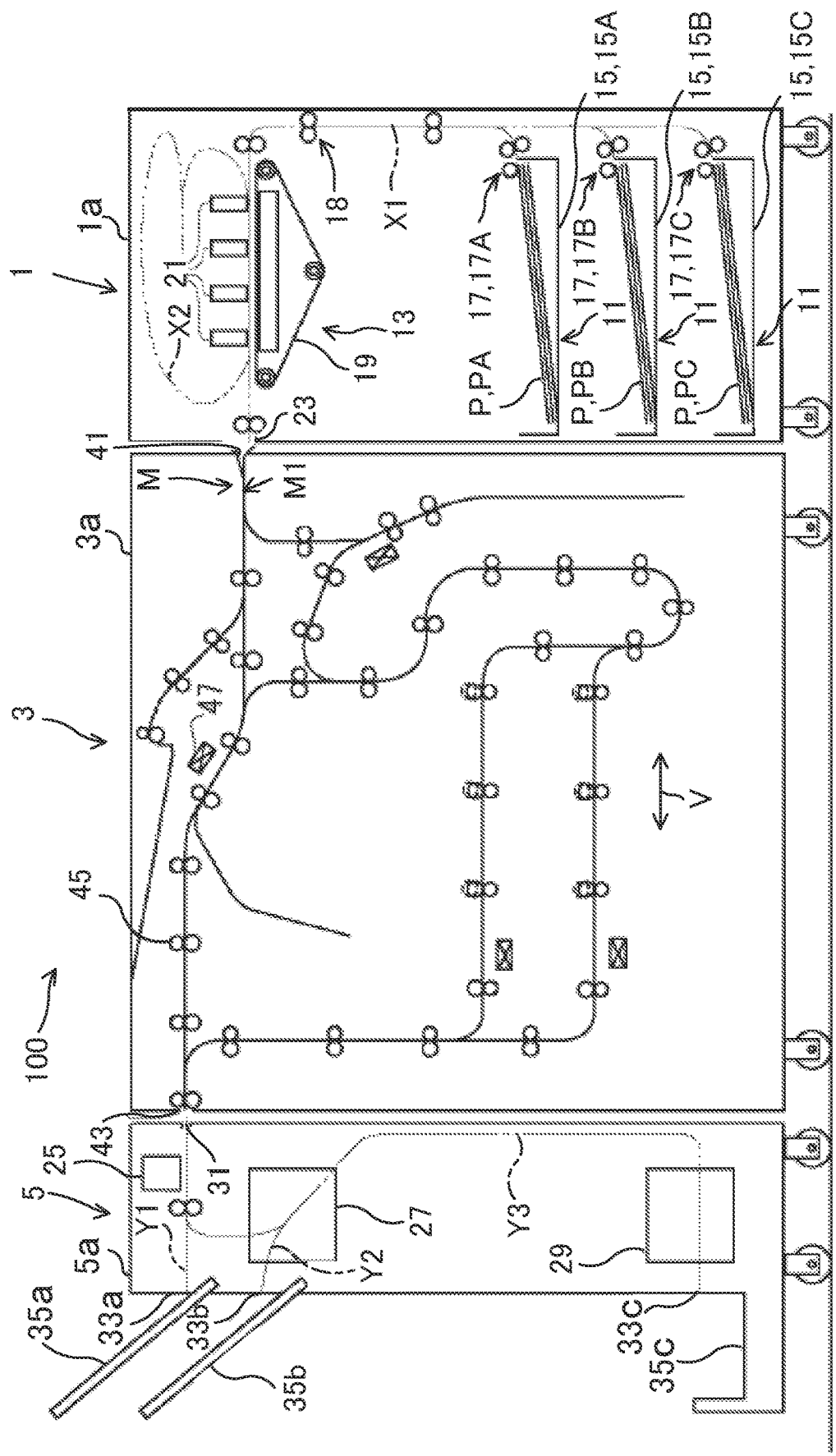
FIG. 4 is a schematic cross-sectional view showing an example of the image forming apparatus for the first purpose, according to the embodiment.

Referring to FIG. 4, a configuration of the image forming apparatus 100 for the first purpose will be described hereunder. FIG. 4 is a schematic cross-sectional view showing an example of the image forming apparatus 100 for the first purpose.

As shown in FIG. 4, the image forming apparatus 100 for the first purpose includes a main body 1. The image forming apparatus 100 for the first purpose may also include an intermediate unit 3 and/or a delivery device 5. In the example shown in FIG. 4, the image forming apparatus 100 for the first purpose is an ink jet recording apparatus. The main body 1 forms an image on a paper sheet P. The intermediate unit 3 relays the paper sheet P, from the main body 1 to the delivery device 5. The delivery device 5 delivers the paper sheet P having an image formed thereon. The paper sheet P exemplifies the "sheet" in the disclosure.

First, a configuration of the main body 1 will be described. A main unit 1a of the main body 1 includes a plurality of feeding devices 11, a transport device 18, and an ink jet image forming device 13. The plurality of feeding devices 11 are aligned in the up-down direction, on the lower side of the main unit 1a. The feeding devices 11 each feed the paper sheet P to the image forming device 13. To be more specific, the feeding devices 11 each feed the paper sheet P to the transport device 18. Then the transport device 18 transports the paper sheet P to the image forming device 13. The transport device 18 includes, for example, a plurality of transport roller pairs.

To be more detailed, the feeding devices 11 each include a paper tray 15 and a feeding device 17. The paper tray 15 exemplifies the "sheet tray" in the disclosure.

The feeding device 17 is provided for each of the plurality of paper trays 15. On each of the paper trays 15, a plurality of paper sheets P are placed. The feeding device 17 feeds the paper sheet P placed on the corresponding paper tray 15, to the image forming device 13. To be more specific, the feeding device 17 feeds the paper sheet P placed on the corresponding paper tray 15, to the transport device 18. The feeding devices 17 each include, for example, a pickup roller.

In the example shown in FIG. 4, the main unit 1a includes three feeding devices 11. Hereinafter, the paper tray 15 and the feeding device 17 of the uppermost feeding device 11 may be referred to as paper tray 15A and feeding device 17A, the paper tray 15 and the feeding device 17 of the intermediate feeding device 11 may be referred to as paper tray 15B and feeding device 17B, and the paper tray 15 and the feeding device 17 of the lowermost feeding device 11 may be referred to as paper tray 15C and feeding device 17C. In addition, the paper sheet P placed on the paper tray 15A may be referred to as paper sheet PA, the paper sheet P placed on the paper tray 15B may be referred to as paper sheet PB, and the paper sheet P placed on the paper tray 15C may be referred to as paper sheet PC.

The image forming device 13 is located on the upper side of the feeding devices 11. The image forming device 13 includes a conveying belt 19 and a plurality of line heads 21. In the example shown in FIG. 4, the image forming device 13 includes four line heads 21. The conveying belt 19 is set to circulate, to convey the paper sheet P. The plurality of line heads 21 are aligned along the running direction of the conveying belt 19. Further, the main unit 1a includes a delivery port 23 for the paper sheet P. The delivery port 23 is located at an upper position of the side wall of the main unit 1a, on the side of the intermediate unit 3.

The main unit 1a includes a transport route X1 and a reversing route X2. The transport route X1 extends from the feeding device 17 of the feeding device 11 to the delivery port 23, through the image forming device 13. The reversing route X2 is used to reverse the front and back faces of the paper sheet P.

Hereunder, an operation of the main body 1 will be described. First, the feeding device 17 of the feeding device 11 delivers the paper sheet P from the paper tray 15, to the transport route X1. The paper sheet P thus delivered is transported by the transport device 18 along the transport route X1, and adsorbed to the upper face of the conveying belt 19, in the image forming device 13. Then an image is formed on the paper sheet P with ink ejected from each of the line heads 21, while the paper sheet P is being conveyed by the rotation of the conveying belt 19. The paper sheet P having the image formed thereon is conveyed by the conveying belt 19, and then delivered through the delivery port 23. The paper sheet P is delivered through the delivery port 23, with the face having the image formed thereon oriented upward. When duplex printing is executed, the paper sheet P having the image formed on one face is transported to the reversing route X2, through which the front and back faces of the paper sheet P is reversed, and transported to the transport route X1, thus to be again adsorbed to the upper face of the conveying belt 19. Then an image is formed on the other face, while the paper sheet P is being conveyed by the rotation of the conveying belt 19. The paper sheet P is delivered through the delivery port 23, with the face having the image formed last oriented upward.

Hereunder, a configuration of the delivery device 5 will be described. The delivery device 5 is a postprocessing device that selectively performs a punching operation, a stapling operation, or an inward folding operation, on the paper sheet P. A main unit 5a of the delivery device 5 includes a punching device 25, a stapling device 27, and an inward folding device 29.

The main unit 5a includes a receiving port 31, a first delivery port 33a, a second delivery port 33b, and a third delivery port 33c. The receiving port 31 is located at an upper position on the sidewall of the main unit 5a on the side of the intermediate unit 3. The receiving port 31 is for receiving the paper sheet P from the intermediate unit 3. A first output tray 35a, a second output tray 35b, and a third output tray 35c are provided on the lower side of the first delivery port 33a, the second delivery port 33b, and the third delivery port 33c, respectively. The main unit 5a also includes a first transport route Y1, a second transport route Y2, and a third transport route Y3.

An operation of the delivery device 5 will now be described hereunder. The paper sheet P having the image formed in the main body 1 is received into the first transport route Y1, through the intermediate unit 3 and the receiving port 31. When the paper sheet P is to undergo the punching operation, the paper sheet P is delivered to the punching device 25, through the first transport route Y1. The paper sheet P that has been delivered undergoes the punching operation by the punching device 25, and then delivered from the first delivery port 33a through the first transport route Y1, thus to be placed on the first output tray 35a. When the paper sheet P is to undergo the stapling operation, the paper sheet P is delivered to the stapling device 27, from the first transport route Y1 along the second transport route Y2. The paper sheet P that has been delivered undergoes the stapling operation by the stapling device 27, and then delivered from the second delivery port 33b, thus to be placed on the second output tray 35b. When the paper sheet P is to undergo the inward folding operation, the paper sheet P is delivered to the inward folding device 29, from the first transport route Y1 through the second transport route Y2 and the third transport route Y3. The paper sheet P that has been delivered undergoes the inward folding operation by the inward folding device 29, and then delivered from the third delivery port 33c, thus to be placed on third output tray 35c.

Hereunder, a configuration of the intermediate unit 3 will be described. The intermediate unit 3 is independent from the main body 1 and the delivery device 5, and connected to each of the main body 1 and the delivery device 5. The intermediate unit 3 serves to reverse the front and back faces of the paper sheet P, correct the skew of the paper sheet P in the width direction W, orthogonal to the transport direction V, and decurl the paper sheet P, while relaying the paper sheet P from the main body 1 to the delivery device 5.

A main unit 3a of the intermediate unit 3 includes a receiving port 41 and a delivery port 43. The receiving port 41 is located at the same height as the delivery port 23 of the main body 1, thus to be opposed thereto. The delivery port 43 is located at the same height as the receiving port 31 of the delivery device 5, thus to be opposed thereto.

The main unit 3a includes a plurality of transport roller pairs 45, a plurality of decurlers 47, and a transport route M. The transport roller pairs 45 and the decurlers 47 are located on the transport route M. The transport route M includes a transport route M1. The transport route M1 extends from the receiving port 41 to the delivery port 43.

An operation of the intermediate unit 3 will be described hereunder. The paper sheet P delivered from the delivery port 23 of the main body 1 is transported to the transport route M1, through the receiving port 41 of the intermediate unit 3. The paper sheet P is further transported by the transport roller pairs 45, to the delivery port 43 along the transport route M1. The decurler 47 performs a decurling operation on the paper sheet P, on the transport route M1.

Here, the image forming apparatus 150 for the second purpose shown in FIG. 1 is, for example, configured similarly to the main body 1 shown in FIG. 4. Accordingly, the image forming apparatus 150 for the second purpose is, for example, an ink jet recording apparatus.

Figure 5:
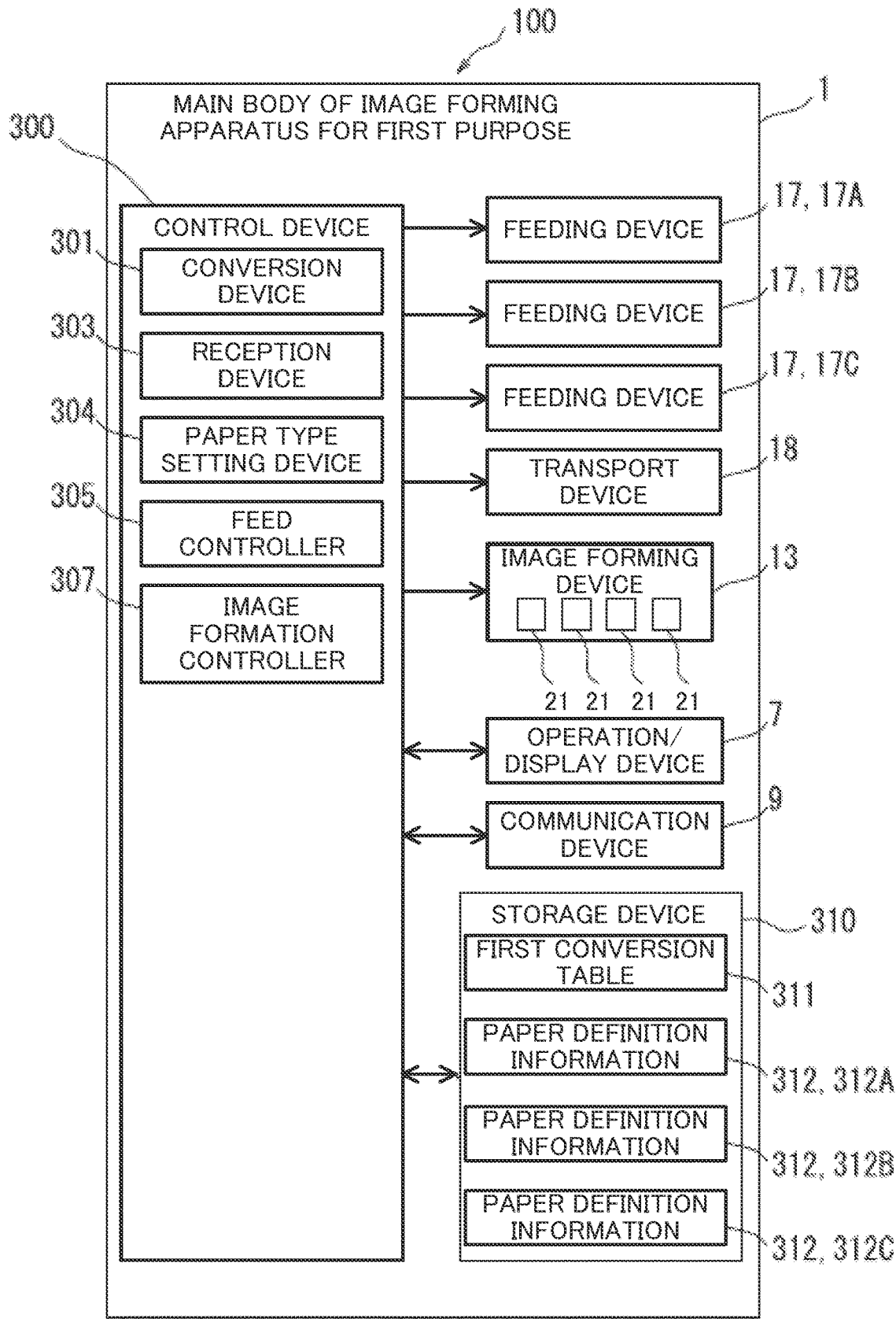
FIG. 5 is a block diagram showing a configuration of a main body of the image forming apparatus for the first purpose, according to the embodiment.

Referring now to FIG. 5, the image forming apparatus 100 for the first purpose will be described in detail. FIG. 5 is a block diagram showing an exemplary configuration of the main body 1 of the image forming apparatus 100 for the first purpose. As shown in FIG. 5, the image forming apparatus 100 for the first purpose further includes an operation/display device 7, a communication device 9, a control device 300, and a storage device 310.

The operation/display device 7 displays various types of information, and receives inputs from the user. The operation/display device 7 includes, for example, a touch screen having a touch panel, and various operation buttons. The touch screen includes, for example, a liquid crystal display, or an organic electroluminescence display.

The communication device 9 is connected to the network NW. The communication device 9 communicates with the terminal 200, via the network NW The communication device 9 is a communication module including, for example, a network card or a network interface controller.

The control device 300 includes a processor such as a central processing unit (CPU). The storage device 310 includes memory units, in which data and computer programs are stored. To be more specific, the storage device 310 includes a main memory unit such as a semiconductor memory, and an auxiliary memory unit such as a semiconductor memory, a solid state drive, or a hard disk drive. The storage device 310 may include a removable medium. The storage device 310 corresponds to an example of a non-transitory computer-readable storage medium.

The control device 300 includes a conversion device 301, a reception device 303, a paper type setting device 304, a feed controller 305, and an image formation controller 307. To be more specific, the processor of the control device 300 executes the computer program stored in the storage device 310, to thereby act as the conversion device 301, the reception device 303, the paper type setting device 304, the feed controller 305, and the image formation controller 307. Here, the feed controller 305 and the image formation controller 307 exemplify the "controller" in the disclosure.

The storage device 310 contains a first conversion table 311 and a plurality of pieces of paper definition information 312. The first conversion table 311 associates the second information IN2 with the third information IN3, as will be subsequently described in further detail. The paper definition information 312 is for defining the paper type of the paper sheet P placed on the paper tray 15 (FIG. 4), as will be subsequently described in further detail. The storage device 310 contains the plurality of pieces of paper definition information 312, in association with the respective paper trays 15. The paper tray 15 exemplifies the "sheet tray" in the disclosure.

Hereinafter, the paper definition information 312 associated with the paper tray 15A may be referred to as paper definition information 312A, the paper definition information 312 associated with the paper tray 15B may be referred to as paper definition information 312B, and the paper definition information 312 associated with the paper tray 15C may be referred to as paper definition information 312C.

In the image forming apparatus 100 for the first purpose, the conversion device 301 converts, when the second information IN2 (FIG. 3) for defining the paper type in association with the image forming apparatus 150 for the second purpose (FIG. 1) is stored in the storage device 310, in association with one of the paper trays 15, such second information IN2 into the third information IN3, of the same format as the first information IN1 (FIG. 2) for defining the paper type in association with the image forming apparatus 100 for the first purpose. Therefore, when the paper sheet P, the type of which has been defined by the second information IN2, is designated for the printing operation, the control device 300 causes the image forming device 13 to form the image on the paper sheet P, under the control according to the paper type indicated by the third information IN3. In this case, since the format of the third information IN3 (characteristic items Q1 to Q4) is the same as that of the first information IN1 (characteristic items Q1 to Q4), the third information IN3 defines the paper type more detailed than the second information IN2.

According to this embodiment, therefore, even when the paper sheet, the type of which has been defined by the second information IN2 associated with the image forming apparatus 150 for the second purpose, is designated in the image forming apparatus 100 for the first purpose, the image forming apparatus 100 for the first purpose can execute the printing operation on such paper sheet, with the high-level printing performance, proper to the image forming apparatus 100 for the first purpose, thereby improving the picture quality of the image formed on the paper sheet. In other words, even when the paper sheet, the type of which has been defined in the format associated with the image forming apparatus 150 for the second purpose, is designated in the image forming apparatus 100 for the first purpose, the picture quality of the image formed on the paper sheet P can be improved. In still other words, even when the paper sheet, the type of which has been defined in the format associated with the purpose of another image forming apparatus 150, is designated in the image forming apparatus 100, the picture quality of the image formed on the paper sheet P can be improved.

To be more specific, the reception device 303 receives, through the operation/display device 7, instruction information A1 for setting the paper type with respect to the paper tray 15.

When the instruction information A1 indicates that the paper type is to be defined by the first information IN1, the paper type setting device 304 sets the first information IN1, indicated by the instruction information A1 with respect to the paper tray 15, in the storage device 310, as the paper definition information 312.

In contrast, when the instruction information A1 indicates that the paper type is to be defined by the second information IN2, the paper type setting device 304 sets the second information IN2, indicated by the instruction information A1 with respect to the paper tray in the storage device 310, as a part of the paper definition information 312.

When the second information IN2 is set with respect to one of the plurality of paper trays 15 in the storage device 310, the conversion device 301 converts the second information IN2 to the third information IN3, at the time of executing the image forming operation according to the second information IN2. In other words, the conversion device 301 automatically converts the second information IN2 to the third information IN3. Then the paper type setting device 304 controls the storage device 310, so as to store the third information IN3 in association with the paper tray 15, with respect to which the second information IN2 has been set. Accordingly, the storage device 310 stores the third information IN3, in association with the paper tray 15, with respect to which the second information IN2 has been set, as a part of the paper definition information 312. According to this embodiment, therefore, the user can easily set the third information IN3 of the same format as the first information IN1, with respect to the paper tray 15, by inputting the instruction information A1 including the second information IN2, through the operation/display device 7. Here, the third information IN3 associated with the paper types indicated by the second information IN2 is stored in advance in the conversion table 311 (FIG. 6). After the second information IN2 is thus converted to the third information IN3, the second information IN2 thus far stored in the storage device 310, and the third information IN3 that has been converted, are both stored in the storage device 310, in association with the paper tray 15.

To be still more specific, when the second information IN2 is set with respect to one of the plurality of paper trays 15 in the storage device 310, the conversion device 301 looks up the first conversion table 311, to thereby convert the second information IN2 to the third information IN3. Therefore, the arrangement according to this embodiment enables the second information IN2 to be converted to the third information IN3, easily and rapidly.

FIG. 6 illustrates an example of the first conversion table 311. As shown in FIG. 6, the third information IN3 is associated with the second information IN2, in the first conversion table 311. In other words, the first conversion table 311 respectively associates the plurality of pieces of second information IN2 with the plurality of pieces of third information IN3. In this embodiment, the first conversion table 311 associates the second information IN2 with the third information IN3, on a one-to-one basis. The third information IN3 contains the characteristic items Q1 to Q4, which are the same as the characteristic items Q1 to Q4 of the first information IN1. The first conversion table 311 is stored in the storage device 310, in advance.

Referring now to FIG. 5 and FIG. 7A to FIG. 7C, an exemplary case where, in the storage device 310, the first information IN1 is stored as the paper definition information 312A with respect to the paper tray 15A (FIG. 4), the first information IN1 is stored as the paper definition information 312B with respect to the paper tray 15B (FIG. 4), and the second information IN2 and the third information IN3 are stored as the paper definition information 312C with respect to the paper tray 15C (FIG. 4), will be described hereunder.

FIG. 7A illustrates an example of the paper definition information 312A, set with respect to the paper tray 15A. As shown in FIG. 7A, the first information IN1 is set with respect to the paper tray 15A, in the paper definition information 312A. However, in the paper definition information 312A, the second information IN2 is not set with respect to the paper tray 15A.

Thus, as shown in FIG. 5 and FIG. 7A, the storage device 310 stores the first information IN1 (paper definition information 312A), in association with the paper tray out of the plurality of paper trays 15A to 15C (FIG. 4), on which the paper sheet PA, the type of which is defined by the first information IN1, is placed.

FIG. 7B illustrates an example of the paper definition information 312B, set with respect to the paper tray 15B. As shown in FIG. 7B, the first information IN1 is set with respect to the paper tray 15B, in the paper definition information 312B. However, in the paper definition information 312B, the second information IN2 is not set with respect to the paper tray 15B. In addition, the content of the first information IN1 set with respect to the paper tray 15B is different from the content of the first information IN1 set with respect to the paper tray 15A, shown in FIG. 7A.

Thus, as shown in FIG. 5 and FIG. 7B, the storage device 310 stores the first information IN1 (paper definition information 312B), in association with the paper tray 15B, out of the plurality of paper trays 15A to 15C, on which the paper sheet PB, the type of which is defined by the first information IN1, is placed.

FIG. 7C illustrates an example of the paper definition information 312C, set with respect to the paper tray 15C. As shown in FIG. 7C, the second information IN2 and the third information IN3 are set with respect to the paper tray 15C, in the paper definition information 312C.

Thus, as shown in FIG. 5 and FIG. 7C, the storage device 310 stores, after the conversion, the second information IN2 and the third information IN3 (paper definition information 312C), in association with the paper tray 15C, out of the plurality of paper trays 15A to 15C, on which the paper sheet PC, the type of which is defined by the second information IN2, is placed.

Still referring to FIG. 5 and FIG. 7A to FIG. 7C, an operation performed by the image forming apparatus 100 for the first purpose to form an image on the paper sheet P, will be described hereunder.

As shown in FIG. 5, the communication device 9 receives designation information A2 designating the paper type, from the terminal 200 (FIG. 1). Then the reception device 303 receives the designation information A2, through the communication device 9.

The designation information A2 includes one of the first information IN1 and the second information IN2. To be more specific, when the designation information A2 includes the first information IN1, the designation information A2 instructs the image forming apparatus 100 for the first purpose, to form the image on the paper sheet P, the type of which is defined by the first information IN1. When the designation information A2 includes the second information IN2, the designation information A2 instructs the image forming apparatus 100 for the first purpose, to form the image on the paper sheet P, the type of which is defined by the second information IN2.

The feed controller 305 controls the feeding device 17, according to the designation information A2 received by the reception device 303.

To be more specific, when the reception device 303 receives the designation information A2 including the first information IN1, in other words the designation information A2 designating the paper type in association with the image forming apparatus 100 for the first purpose, the feed controller 305 controls the feeding device 17 so as to feed the paper sheet P from the paper tray 15 with which the first information IN1 is associated.

In addition, the image formation controller 307 controls the image forming device 13 (more specifically, line heads 21), according to the designation information A2 received by the reception device 303. The image formation controller 307 controls the action of the image forming device 13, so as to form the image making the most of the capability proper to the image forming apparatus 100 for the first purpose, by appropriately adjusting the size and amount of ink droplets to be ejected and the tone of the color, in accordance with the paper type identified by the first information IN1 on the basis of the combination of the plurality of characteristic items Q1 to Q4. The information provided by the second information IN2 alone is unable, because of lack of a sufficient number of characteristic items, to allow the image forming apparatus 100 for the first purpose to execute the image forming operation, making the most of the capability proper thereto. Therefore, in order to enable the image formation controller 307 to control the image forming device 13 so as to exhibit the optimum performance, the second information IN2 is converted to the third information IN3, to make up for the shortage of the second information IN2, with the characteristic items Q1 to Q4 according to the first information IN1.

To be more specific, when the reception device 303 receives, as the designation of the paper sheet to be used for the printing operation, the designation information A2 including the first information IN1, in other words the designation information A2 designating the paper type in association with the image forming apparatus 100 for the first purpose, the image formation controller 307 controls the image forming device 13 (more specifically, line heads 21), on the basis of the first information IN1 (paper definition information 312) for defining the paper type in detail, in the storage device 310. As result, the image forming device 13 can form a high-quality image, appropriate for the first purpose (commercial printing purpose), on the paper sheet P.

For example, when the first information IN1 included in the designation information A2 includes the characteristic item Q1 indicating "Plain", the characteristic item Q2 indicating "Ink Jet Treated", the characteristic item Q3 indicating "Preprinted", and the characteristic item Q4 indicating "100 gsm", the feed controller 305 controls the feeding device 17, so as to feed the paper sheet PA from the paper tray 15A, with which the first information IN1 (paper definition information 312A in FIG. 7A) is associated. Accordingly, the feeding device 17A feeds the paper sheet PA, from the paper tray 15A to the image forming device 13. In addition, the image formation controller 307 controls the image forming device 13 (more specifically, line heads 21), at the time of forming the image on the paper sheet PA delivered from the feeding device 17A, according to the first information IN1 (paper definition information 312A in FIG. 7A), set with respect to the paper tray 15A in the storage device 310.

In contrast, when the reception device 303 receives, as the designation of the paper sheet to be used for the printing operation, the designation information A2 including the second information IN2, in other words the designation information A2 designating the paper type in association with the image forming apparatus 150 for the second purpose, the feed controller 305 controls the feeding device 17 so as to feed the paper sheet P from the paper tray 15 with which the second information IN2 is associated. The mentioned arrangement according to this embodiment, therefore, enables the paper sheet P to be delivered from the appropriate paper tray 15, even when the paper sheet P, the type of which is defined by the second information IN2 associated with the image forming apparatus 150 for the second purpose, is designated in the image forming apparatus 100 for the first purpose.

Further, when the reception device 303 receives the designation information A2 including the second information IN2, in other words the designation information A2 designating the paper type in association with the image forming apparatus 150 for the second purpose, the image formation controller 307 controls the image forming device 13 (more specifically, line heads 21), according to the third information IN3 (paper definition information) converted by the conversion device 301, and defining the paper type in detail in the storage device 310. Such arrangement according to this embodiment enables, therefore, the image forming device 13 to form a high-quality image, of the same level as is attained when the paper type is defined by the first information IN1, on the paper sheet P, on the basis of the third information IN3 having the same format as the first information IN1, even when the paper sheet P, the type of which is defined by the second information IN2 associated with the image forming apparatus 150 for the second purpose, is designated in the image forming apparatus 100 for the first purpose.

For example, when the second information IN2 included in the designation information A2 includes the characteristic item Q10 (Q12) indicating "Preprinted Paper", the feed controller 305 controls the feeding device 17C, so as to feed the paper sheet PC from the paper tray 15C, with which the second information IN2 (paper definition information 312C in FIG. 7C) is associated. Accordingly, the feeding device 17C feeds the paper sheet PC, from the paper tray 15C to the image forming device 13. Further, the image formation controller 307 controls the image forming device 13 (more specifically, line heads 21), at the time of forming the image on the paper sheet PC delivered from the feeding device 17C, according to the third information IN3 (paper definition information 312C in FIG. 7C) set with respect to the paper tray 15C, in the storage device 310.

Referring now to FIG. 5 and FIG. 8, the paper type setting operation with respect to the paper tray 15 will be described hereunder. FIG. 8 is a flowchart showing an exemplary process of the paper type setting operation, performed by the image forming apparatus 100 for the first purpose. As shown in FIG. 8, the paper type setting operation includes step S1 to step S6.

At step S1, as shown in FIG. 5 and FIG. 8, the reception device 303 receives the instruction information A1 to set the paper type with respect to the paper tray 15, from the operation/display device 7. Here, the reception device 303 may receive the instruction information A1, from the terminal 200 via the communication device 9.

At step S2, the paper type setting device 304 (control device 300) decides which of the first information IN1 and the second information IN2 is included in the instruction information A1.

When it is decided at step S2 that the instruction information A1 includes the first information IN1, the operation proceeds to step S3.

At step S3, the paper type setting device 304 sets the first information IN1 with respect to the paper tray 15 (e.g., paper tray 15A) in the storage device 310, as the paper definition information 312 (e.g., paper definition information 312A). Thereafter, the operation is finished.

In contrast, when it is decided at step S2 that the instruction information A1 includes the second information IN2, the operation proceeds to step S4.

Proceeding to S4, the paper type setting device 304 sets the second information IN2 with respect to the paper tray 15 (e.g., paper tray 15C) in the storage device 310, as a part of the paper definition information 312 (e.g., paper definition information 312C).

At step S5, the conversion device 301 looks up the first conversion table 311, and converts the second information IN2 to the third information IN3.

Then at step S6, the paper type setting device 304 sets the third information IN3 with respect to the paper tray 15 (e.g., paper tray 15C), as a part of the paper definition information 312 (e.g., paper definition information 312C). Thereafter, the operation is finished.

According to this embodiment, as described above with reference to FIG. 8, the second information IN2 is converted to the third information IN3 having the same format as the first information IN1 (step S5), even when the paper sheet P, the type of which has been defined by the second information IN2 associated with the image forming apparatus 150 for the second purpose, is designated in the image forming apparatus 100 for the first purpose, and therefore the quality of the image formed on the paper sheet P can be improved. In other words, the image forming apparatus 100 for the first purpose can remain compatible with the image forming apparatus 150 for the second purpose, while securing the high image quality.

Figure 9:
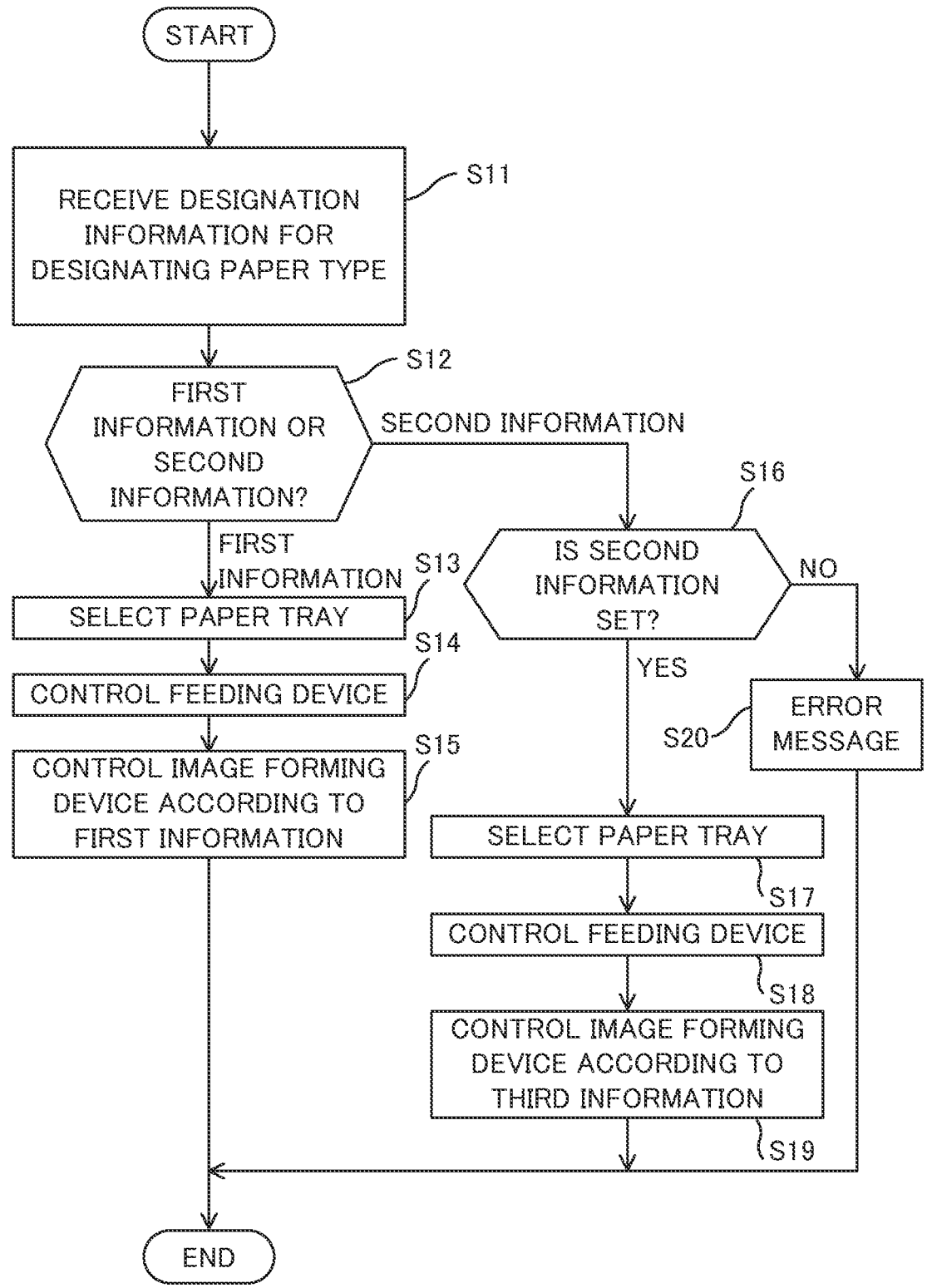
FIG. 9 is a flowchart showing an exemplary process of an image forming operation, executed by the image forming apparatus for the first purpose according to the embodiment.

Referring to FIG. 5 and FIG. 9, the image forming operation performed by the image forming apparatus 100 for the first purpose will be described hereunder. FIG. 9 is a flowchart showing an exemplary process of the image forming operation, performed by the image forming apparatus 100 for the first purpose. As shown in FIG. 9, the image forming operation includes step S11 to step S19. In the paper type setting operation described with reference to FIG. 8, the conversion by the conversion device 301 from the second information IN2 to the third information IN3 is executed after the reception device 303 has received the instruction information A1 for setting the paper type. However, in the image forming operation shown in FIG. 9, the conversion device 301 converts the second information IN2 to the third information IN3, at the time that the second information IN2 is set with respect to the paper tray 15, and stored in the storage device 310. Thus, after the second information IN2 is converted to the third information IN3, the second information IN2 thus far stored in the storage device 310, and the third information IN3 that has been converted, are both stored in the storage device 310, in association with the paper tray 15.

As shown in FIG. 5 and FIG. 9, at step S11 the reception device 303 receives the designation information A2 for setting the paper type, through the communication device 9.

At step S12, the feed controller 305 (control device 300) decides which of the first information IN1 and the second information IN2 is included in the designation information A2.

When it is decided at step S12 that the designation information A2 includes the first information IN1, the operation proceeds to step S13.

Then at step S13, the feed controller 305 selects the paper tray 15 (e.g., paper tray 15A), with respect to which the first information IN1 is set as the paper definition information 312 (e.g., paper definition information 312A).

At step S14, the feed controller 305 controls the feeding device 17 (e.g., feeding device 17A) associated with the paper tray 15 selected at step S13, so as to feed the paper sheet P (e.g., paper sheet PA) to the image forming device 13.

At step S15, the image formation controller 307 controls the image forming device 13, according to the first information IN1 (e.g., first information IN1 in paper definition information 312A) set with respect to the paper tray 15 selected at step S13. In other words, the image formation controller 307 controls the image forming device 13, so as to form the image on the paper sheet P (e.g., paper sheet PA), according to the first information IN1. Therefore, the image forming device 13 forms the image on the paper sheet P, according to the first information IN1. Thereafter, the operation is finished.

In contrast, when it is decided at step S12 that the designation information A2 includes the second information IN2, the operation proceeds to step S16.

Then at step S16, the feed controller 305 (control device 300) decides whether the second information IN2 is set with respect to any of the plurality of paper trays 15.

When it is decided at step S16 that the second information IN2 is set with respect to the paper tray 15, the operation proceeds to step S17.

At step S17, the feed controller 305 selects the paper tray 15 (e.g., paper tray 15C), with respect to which the second information IN2 has been set as the paper definition information 312 (e.g., paper definition information 312C).

At step S18, the feed controller 305 controls the feeding device 17 (e.g., feeding device 17C) associated with the paper tray 15 selected at step S17, so as to feed the paper sheet P (e.g., paper sheet PC) to the image forming device 13.

Then at step S19, the image formation controller 307 controls the image forming device 13, according to the third information IN3 (e.g., third information IN3 in paper definition information 312C) set with respect to the paper tray 15 selected at step S17. In other words, the image formation controller 307 controls the image forming device 13, so as to form the image on the paper sheet P (e.g., paper sheet PC), according to the third information IN3. Therefore, the image forming device 13 forms the image on the paper sheet P, according to the third information IN3. Thereafter, the operation is finished.

In contrast, when it is decided at step S16 that the second information IN2 is set with respect to none of the paper trays 15, the operation proceeds to step S20.

At step S20, the image formation controller 307 (control device 300) controls the operation/display device 7 so as to display an error message. Accordingly, the operation/display device 7 displays the error message. The error message includes, for example, a notice to the effect that the paper sheet P, the type of which is defined by the second information IN2, is unable to be designated in the image forming apparatus 100 for the first purpose. At step S20, further, the feed controller 305 restricts the feeding device 17 from feeding the paper sheet, and the image formation controller 307 restricts the image forming device 13 from performing the image forming operation. Such arrangements according to this embodiment prevent an image of low quality from being formed on the paper sheet P. Thereafter, the operation is finished.

Variation

A variation of the foregoing embodiment will be described, with reference to FIG. 10. The variation is different from the embodiment, in that the storage device 310 contains a second conversion table 313, in place of the first conversion table 311 (FIG. 6). The following description focuses on the difference of the variation from the embodiment.

FIG. 10 illustrates an example of the second conversion table 313 according to the variation. As shown in FIG. 5 and FIG. 10, the storage device 310 contains the second conversion table 313, in place of the first conversion table 311.

In the second conversion table 313, a plurality of pieces of third information IN3, different from each other, are associated with an item of the second information IN2. The conversion device 301 looks up the second conversion table 313, and converts the one item of the second information IN2 to one of the plurality of pieces of third information IN3. According to the variation, therefore, the conversion device 301 can convert the one item of the second information IN2 to a more appropriate one of the third information IN3, among the plurality of pieces of third information IN3.

For example, the conversion device 301 looks up the second conversion table 313, and converts one of the second information IN2 to one of the plurality of pieces of third information IN3, according to the destination of the image forming apparatus 100 for the first purpose. In this case, in the second conversion table 313 shown in FIG. 10, the third information IN3 further includes a characteristic item Q5. The characteristic item Q5 indicates the destination of the image forming apparatus 100 for the first purpose. Therefore, for example when the destination of the image forming apparatus 100 for the first purpose is USA, and the second information IN2 included in the instruction information A1 (step S1 in FIG. 8) includes the characteristic item Q10 (Q12) indicating "Preprinted Paper", the conversion device 301 looks up the second conversion table 313, and converts the second information IN2 indicating "Preprinted Paper" to the third information IN3 including the characteristic item Q5 indicating "USA". The plurality of pieces of third information IN3, stored in the second conversion table 313 in association with one of the second information IN2, include destination items, each indicating a destination different from each other. For example, the conversion device 301 converts, according to the designation of the destination of the image forming apparatus 100 for the first purpose, received by the reception device 303 via the operation/display device 7, the second information IN2 to the third information IN3 that includes the characteristic item Q5 (destination item) indicated the destination designated.

In general, the types of the printing apparatus can be classified into the office model and the production model. The office model and the production model are designed for different purposes. The office model is for the purpose of office use, and compatible with, for example, the paper sheet of Type 1. The production model is for the purpose of commercial printing, and compatible with, for example, the paper sheet of Type 3.

In the office model, the paper type is defined in the format for the office model. The paper type is unable to be defined in detail, with the format for the office model. However, the types of the paper sheet to be used for the office model are limited, and therefore the definition of the paper type does not have to be detailed.

In the case of the production model, in contrast, the printing quality is an important issue, and therefore the paper type has to be defined in detail. Accordingly, in the production model, the paper type is defined in detail, in the format for the production model. In other words, in the production model, the paper type is defined in the format appropriate for the purpose of the production model (commercial printing). Therefore, the format in which the paper type is defined in the production model is different from the format in which the paper type is defined in the office model.

However, there are cases where, in the printing operation of the production model, the paper sheet defined in the format for the office model is designated. In other words, there are cases where the paper sheet defined in the format incompatible with the production model is designated for the printing operation of the production model. In such a case, it may be difficult to execute an optimum printing control for the printing operation of the production model, with respect to the paper sheet defined in the format for the office model.

Consequently, an expected print quality may fail to be secured, depending on the circumstances.

With the arrangement according to the foregoing embodiment, even when the paper sheet, the type of which has been defined in the format associated with the purpose of another image forming apparatus, is designated, the image forming apparatus 100 for the first purpose can execute the printing operation on such paper sheet, with the high-level printing performance, proper to the image forming apparatus 100 for the first purpose, thereby improving the picture quality of the image formed on the paper sheet.

The embodiment of the disclosure has been described as above, with reference to the drawings. However, the disclosure is not limited to the foregoing embodiment, but may be modified in various manners, without departing from the scope of the disclosure. The plurality of elements disclosed in the embodiment may be modified as desired. For example, one of the elements, out of all the elements referred to in the embodiment, may be added to the elements of another embodiment, or some of the elements out of all the elements referred to in the embodiment may be excluded from the embodiment.

The drawings schematically illustrate the essential elements, for the sake of better understanding of the disclosure, and the thickness, length, number of pieces, and interval of the illustrated elements may differ from the actual ones, owing to the convenience in making up the drawings. Further, the configuration of the elements according to the embodiment is merely exemplary, and it is a matter of course that various modifications may be made, without substantially departing from the advantageous effects of the disclosure.

(1) In the embodiment and the variation thereof, the number of characteristic items in each of the first information IN1, the second information IN2, and the third information IN3 is not specifically limited, provided that the number of characteristic items in each of the first information IN1 and the third information IN3 is larger than the number of characteristic items in the second information IN2.

(2) Although the "sheet" is exemplified by the paper sheet P, in the foregoing embodiment and the variation thereof, the disclosure is not limited thereto. The "sheet" may be, for example, a cloth sheet or a synthetic fiber sheet.

(3) Although the image forming apparatuses 100 and 150 are exemplified by the ink jet recording apparatus, in the foregoing embodiment and the variation thereof, the disclosure is not limited thereto. The image forming apparatuses 100 and 150 may be an image forming apparatus based on the electrophotography. In this case, the image forming device of the image forming apparatus includes, for example, a photoconductor drum, a charging device, an exposure device, a developing device, a transfer device, a cleaning device, and a fixing device.

INDUSTRIAL APPLICABILITY

The disclosure is applicable to the industrial field of the image forming apparatus.

While the present disclosure has been described in detail with reference to the embodiments thereof, it would be apparent to those skilled in the art the various changes and modifications may be made therein within the scope defined by the appended claims.

What is claimed is:

1. An image forming apparatus for a first purpose, configured to form an image on a sheet according to a sheet type, the image forming apparatus comprising:
   a plurality of sheet trays, on each of which a plurality of sheets are placed;
   an image forming device that forms an image on the sheet;
   a control device including a processor, and configured to act, when the processor executes a control program, as
      a setting device that sets one of first information for defining the sheet type with a plurality of items in association with the image forming apparatus for the first purpose, and second information for defining the sheet type with a fewer number of items than the first information, in association with another image forming apparatus for a second purpose different from the first purpose, as paper definition information for defining the sheet type, with respect to each of the plurality of sheet trays; and
   a storage device in which the paper definition information set by the setting device is stored, with respect to each of the sheet trays,
   the control device being configured to further act, when the processor executes the control program, as:
   a conversion device that converts the second information stored in the storage device, to third information of a same format as the first information, when the second information is set with respect to a sheet tray; and
   a controller that causes, when the sheet, the sheet type of which has been defined by the second information, is designated as the sheet to be used for an image forming operation by the image forming device, the sheet tray to feed the designated sheet, and causes the image forming device to form an image on the sheet, through a control relevant to the sheet type indicated by the third information.

2. The image forming apparatus according to claim 1, further comprising a reception device that receives designation information for designating the sheet to be used for the image forming operation by the image forming device,
   wherein, when designation of the sheet, the sheet type of which has been defined by the first information, is received by the reception device, the controller causes the image forming device to form the image on the sheet, through a control according to the sheet type indicated by the first information, and
   when the designation of the sheet, the sheet type of which has been defined by the second information, is received by the reception device, the controller causes the image forming device to form the image on the sheet, through a control according to the sheet type indicated by the third information.

3. The image forming apparatus according to claim 1,
   wherein the storage device further contains a first conversion table,
   the third information is associated with the second information, in the first conversion table, and
   the conversion device looks up the first conversion table, and converts the second information to the third information.

4. The image forming apparatus according to claim 1,
   wherein the storage device further contains a second conversion table,
   a plurality of pieces of the third information, different from each other, are associated with one item of the second information, in the second conversion table, and the conversion device looks up the second conversion table, and converts the one item of the second information to one of the plurality of pieces of the third information.

5. The image forming apparatus according to claim 1, wherein the third information includes, as one of the plurality of items, a destination item indicating a destination of the image forming apparatus for the first purpose, and a plurality of pieces of the third information include destination items indicating destinations different from each other, and when the destination of the image forming apparatus for the first purpose is designated, the conversion device converts the second information, to the third information that includes the destination item indicating the destination designated.

* * * * *